United States Patent [19]
Koike et al.

[11] Patent Number: 5,560,843
[45] Date of Patent: Oct. 1, 1996

[54] FRAME CONSTRUCTION AND A MACHINING DEVICE PROVIDED WITH IT

[75] Inventors: Yasuo Koike; Kumeo Iida; Takehiko Karukome; Fukuyoshi Kurosawa, all of Tokyo, Japan

[73] Assignee: Koike Sanso Kogyo Co., Ltd., Tokyo, Japan

[21] Appl. No.: 274,449

[22] Filed: Jul. 13, 1994

[51] Int. Cl.⁶ .......................... B23K 26/00; B23K 26/10
[52] U.S. Cl. ................... 219/121.48; 219/121.67; 219/121.56; 219/121.39; 219/121.37; 266/69; 266/77
[58] Field of Search .................... 219/121.48, 121.36, 219/121.67, 121.74, 121.78, 121.39, 121.65, 121.56, 121.37; 266/67, 77, 69

[56] References Cited

U.S. PATENT DOCUMENTS

| | | | |
|---|---|---|---|
| 4,583,895 | 4/1986 | Theurer | 409/295 |
| 4,950,861 | 8/1990 | Erlenmaier et al. | 219/121.67 |
| 4,952,774 | 8/1990 | Sugimoto et al. | 219/133 |
| 4,973,819 | 11/1990 | Thatcher | 219/121.78 |
| 5,304,773 | 4/1994 | Kilian et al. | 219/121.78 |
| 5,350,897 | 9/1994 | Chun | 219/121.39 |

*Primary Examiner*—Mark H. Paschall
*Attorney, Agent, or Firm*—Townsend & Banta

[57] ABSTRACT

The present invention provides for a frame construction which comprises frames wherein a machining tool and functional devices for making the tool operate are mounted on separate frames, and the respective frames can run independently. The present invention also provides a machining device which utilizes the aforementioned frame construction so that machining accuracy can be maintained irrespective of the weight of the functional devices mounted on the frame.

24 Claims, 6 Drawing Sheets

FRAME CONSTRUCTION AND A MACHINING DEVICE PROVIDED WITH IT

BACKGROUND OF THE INVENTION

1. Field of the Invention

The present invention relates to a frame construction which comprises two frames, the first frame of which carries a machining tool, while the second frame carries functional devices for making the machining tool operate, and a machining device in which the frame construction is used in the machining work.

2. Description of the Prior Art

A laser machining device is widely used for cutting, welding, marking, and engraving workpieces such as a steel plate, a stainless steel plate, plywood, and a plastic plate by applying a laser beam to the workpiece. Recently, a high-power laser generator was developed by which workpieces such as thick steel plates can be cut or machined at a high speed. For this reason, a large-sized laser machining device is gradually being applied in plants in which members of a ship, a bridge and a steel structure are manufactured by machining relatively thicker plates.

In a laser machining device, it is necessary that a laser spot is moved on a workpiece with the diameter of the laser spot being maintained at the fixed value, in order to obtain a stable quality of manufactured goods. Namely, it is necessary to maintain the length of the light path of from a laser generator to a workpiece at a constant value.

For this reason, a laser machining device generally includes a frame composed of a saddle which is movably put on rails, and a cross girder which is disposed perpendicular to the rails, wherein a carriage moving transversely on the cross girder carries a laser torch and a laser generator.

On the other hand, a plasma machining device is also widely used in which a plasma arc is applied to a workpiece so that cutting, welding, gouging and other machining can be made. Generally, the plasma machining device comprises a frame which carries a plasma torch, while a plasma power source is arranged on a floor, wherein the plasma torch and the plasma power source are connected through a cabtire cable for high power.

It is also known that when workpieces such as steel plates, and stainless steel plates are cut by using a plasma torch, a large amount of dust is generated with cutting. Therefore, a machining device with plasma torch is provided with a dust collecting equipment. It is also known that fumes including dust is generated when steel plates or steel plates on which antitrust paint is coated is cut with a gas torch.

It is known that a plasma machining device provided with dust collecting equipment in which a main body composed of a suction fan, a dust separator and others is arranged on a floor, while a duct is arranged parallel to rails on which a frame carrying a plasma runs, wherein an opening of the duct is opposed to the plasma torch while the frame is moved. Since in the dust collecting equipment, the main body is secured on the floor, together with the frame being kept off from the main body, the length of the extended part of the duct is increased, and the a suction resistance is increased while the dust collecting efficiency is lowered.

For this reason, the main body of the dust collecting equipment is mounted on a frame of the machining device, wherein an opening of the duct connected with the main body is opposed to the plasma torch. In the dust collecting equipment, a length of extended part of duct can be maintained at the fixed value, irrespective of the position of the frame on rails, so that the stable dust collecting efficiency can be exerted. However, the weight of the laser generator is increased, together with an increase in the power of the laser generator, so that the total weight of the machining device provided with the high-power laser generator amounts to 5 tons to 8 tons. Further, in the plasma machining device, it is required that a plurality of plasma torches are mounted on the frame. However, in such a machining device, the force required for drawing cabtire cables is increased, and drawing of the cables becomes intricate. In order to avoid this problem, a power source is mounted on the frame, by which the weight of the machining device is increased.

Further, in a gas machining device, it is also required that a plurality of gas torches be mounted on a frame, by which the weight of the machining device is increased together with an increase in functional devices such as valves acting to open or block passage of preheating oxygen, fuel gas, and cutting oxygen, pressure control valves, and a backfire preventive device.

Further, in a machining device provided with dust collecting equipment on a frame, there is a in problem that the dust collecting equipment provided on the frame increases the load applied to the frame and the high rigidity of the frame required corresponding to the increased load increases the empty weight of the frame. Further, there is a problem that together with an increase in the weight of the frame, the force of inertia is increased, and so a rise time of from the starting time point of the machining process to a time point when the speed of the frame reaches the cutting speed is increased.

Speed control of tools such as laser torches, plasma torches, and gas torches become difficult, together with an increase in the weight of the machining device. Particularly in laser machining or plasma machining, it is required that the moving speed of a torch reaches the machining speed, which is set according to the power of the laser generator or a plasma electric current, as quickly as possible, wherein when the moving speed of the torch and the machining speed is unbalanced, the impossibility or inferiority of the machining is generated so that the quality of the product cannot be maintained.

Particularly, in a NC machining device or copying machining device, considering that an increase in the weight of the machining device accompanies an increase in the force of inertia thereof, when the cutting direction is changed over, it is regarded that a long section is provided in front of the turning point of a cutting torch so that the cutting speed can be decreased in the section. In this case, excessive heat is given to a workpiece in the section, so that the quality of the cut surface is much worse.

In order to avoid the above-mentioned problems, a high-power drive motor is needed for increasing the a machining speed from a state of stop to the given machining speed in a short period time, therefore, the drive motor and conductor means are required to be large-sized. Further, the large-sized motor and conductor means make the machining speed change in a short time according to the drive signal inputted to the drive motor, when the direction of the cutting torch is changed over at a corner part which has a shape with a right-angled corner, or when the speed of the machining device is decreased from the machining speed to a state of stop, and accordingly a brake with immerse braking force is needed.

However, when a high-power drive device and a brake with immerse braking force are used, considerable shock is applied to a machining device every time the machining speed is changed. Therefore, the strength of a drive shaft and a frame must be increased so that the weight of the machining device is significantly increased. Further, in order to control the machining speed without the shock being applied, a runaway section is preferably provided in front of a point where the desired speed is attained, and in the runaway section the machining speed gradually rises or falls. However, in this case, the quality of the product deteriorates in the runaway section.

Further, generated when the machining speed is changed, the shock transforms into the frequency of torch which exerts a bad influence on the machining accuracy. In this case, substantial change in the speed is generated near a turning point of the machining direction. Thus, the positioning accuracy of the torch becomes worse a braking force and the drive force acting on the frame, and a poor influence is exerted on the quality of the machined surface and the dimensional accuracy.

SUMMARY OF THE INVENTION

It is an object of the present invention to provide a frame construction which comprises frames wherein a machining tool and functional devices for making the tool operate are mounted on separate frames and the respective frames can run independently.

It is an another object of the present invention to provide a machining device which uses the above-mentioned frame construction so that the machining accuracy can be maintained irrespective of the a weight of the functional devices mounted on the frame.

A frame construction according to the present invention is a frame construction provided with a machining tool for machining a workpiece characterized in that said frame construction comprises: a first frame which carries the machining tool and is able to run on longitudinal rails; a second frame which carries functional devices for making the tool operate and is able to run on longitudinal rails; a carriage with the machining tool which is mounted on the first frame so as to be able to transversely move in a direction perpendicular to the longitudinal rails.

Further, the above-mentioned frame construction is characterized in that said frame construction further comprises a first control unit for controlling the first drive means and the third drive means in such a manner that the machining tool is scanned by drawing the preset tracing pattern; and a second control unit for controlling the second drive means in such a manner that the second frame is moves by following up the first drive means.

Further, the frame construction is characterized in that the first frame is engaged with the second frame, that the longitudinal rails for the first frame and the longitudinal rails for the second frame are the same rails, that the longitudinal rails for the first frame and the longitudinal rails for the second frame are laid parallel to each other and the first and second frames are each put on the several rails, and that the longitudinal rails for the first frame and the longitudinal rails for the second frame are laid parallel to each other and one of the longitudinal rails for the first frame is provided on the second frame.

Since the frame construction according to the present invention as above-mentioned comprises a first frame and a second frame which are independent and which can run on rails, the acceleration- and acceleration control of the first and second frames can be made corresponding to the force of inertia based on the weight of something mounted on each frame and the empty weight of each frame. Namely, the speed control of moving the machining tool can be easily made by mounting the machining tool on the first frame and lightening the weight of the first frame. Functional devices for making the machining tool operate are mounted on the second frame, and the second frame is controlled independently from the first frame, and can follow up the first frame. Accordingly, when carrying out the machining, the machining can be carried out to a high accuracy and with high quality, by securing the moving accuracies of the first frame and the machining tool. Further, the first frame can be sharply lightened as compared with a conventional machining device, and can be formed with high rigidity so that the speed control can be easily maintained. Therefore, the machining accuracy can be maintained or improved.

Further, the machining device according to the present invention is characterized in that said machining device comprises: the above-mentioned frame construction; a laser torch mounted on a carriage on a first frame; and a laser generator mounted on the second frame, wherein when machining of the workpiece is carried out, the laser torch mounted on the first frame is moved at the fixed machining speed, while the second frame moved by following up the first frame.

Further, the machining device according to the present invention is characterized in that said machining device comprises: the above-mentioned frame construction; a plasma torch mounted on a carriage on the first frame; and a plasma power source mounted on the second frame, wherein when machining of the workpiece is carried out, the plasma torch mounted on the first frame is moved at a fixed machining speed, while the second frame moves by following up the first frame.

Further, the machining device according to the present invention is characterized in that said machining device comprises: the above-mentioned frame construction; a gas torch mounted on a carriage on the first frame; and devices which act to open and block the passage of preheating oxygen, fuel gas, and cutting gas mounted on the second frame, wherein when machining of the workpiece is carried out, the gas torch mounted on the first frame is moved at the fixed speed, while the second frame is moves by following up the first frame.

In the above-mentioned machining device, the first frame carries machining tools such as a laser torch, a plasma torch, and a gas torch and a carriage which is movable in a direction perpendicular to the rails, while the second frame carries comparatively heavy functional devices such as a laser generator, a plasma power source, valves acting to open or block passage of preheating oxygen, fuel gas and cutting oxygen, a control panel and others so that the weight of the functional devices can be held by the second frame. For this reason, the load applied to the first frame can be reduced, and the empty weight can be reduced so that the force of inertia of the first frame can be decreased. Accordingly, it becomes possible to shorten the rise time from the starting point to a point when the moving speed reaches the cutting speed, and the speed control of torch at the turning point of the machining direction becomes easy so that the machining accuracy can be maintain.

Heavy devices are mounted on the second frame. However, since the first frame is independent from the second frame, it is not necessary that the second frame be controlled by synchronizing speed of the second frame with the speed of the first frame. Namely, it is not necessary to coincide the moving speed of the second frame at the turning point of the machining direction with the moving speed of the torch so that the rise time or fall time can be sufficiently taken. Since the second frame follows up the first frame, a runaway section with the desired length can be provided in front of a position where the desired speed is attained, and the movement or stop of the second frame can be made by a small-sized drive device or a brake having a low braking force.

When the frame construction according to the present invention is applied to a laser machining device, a plasma machining device, and a gas machining device, it becomes possible to burden the second frame with an increase in the load by the increase in power of the laser generator, an increase in the number of power sources corresponding to an increase in the number of plasma torches, or an increase in the number of devices acting to open or block passage of preheating oxygen, fuel gas, and cutting oxygen with an increase in number of gas torches, therefore the speed fluctuations of the second frame exert no influence on the machining accuracy.

Accordingly, the speed control for the second frame becomes easy by moving the first and second flames with the second frame following up the first frame, and therefore, moving of the first and second flames can be made without a high-power motor and brake.

Therefore, without a substantial increase in cost of the device, the a machining device in which the machining accuracy can be maintained can be provided.

The machining device according to the present invention is characterized in that in a machining device comprising the above-mentioned frame construction, and a tool which generates dust with cutting of a workpiece, said machining device comprises: a cutting tool mounted on a carriage on the first frame; dust collecting equipment for collecting dust generated by cutting of a workpiece; and a duct having an end portion connected with the dust collecting equipment and the other end portion opened toward the cutting tool mounted on the first frame. The duct has preferably a part which is formed capable of expansion and contraction.

In the above-mentioned machining device, the first frame which runs on rails carries a machining tool in which when a cutting workpiece, dust is generated ( for example, a plasma cutting torch, a gas cutting torch, and a laser cutting torch, hereinafter referred to as "cutting torch"), while the second frame which moves along rails carries dust collecting equipment, wherein an opening of a duct connected with the dust collecting equipment is directed toward the cutting a torch so that dusts generated when cutting workpiece can be collected into the duct.

Further, in the machining device in which the machining tool ( cutting tool ) is mounted on the first frame, while the dust collecting equipment is mounted on the second frame, irrespective of the weight of the dust collecting equipment, the first frame can be lightened, and so the response of the frame against change in speed by the first drive means can be improved. Therefore, the tracing accuracy of the machining tool against the desired tracing line can be improved so that the dimensional accuracy of the product can be improved.

DETAILED DESCRIPTION OF THE PREFERRED EMBODIMENTS

Figure 1A:
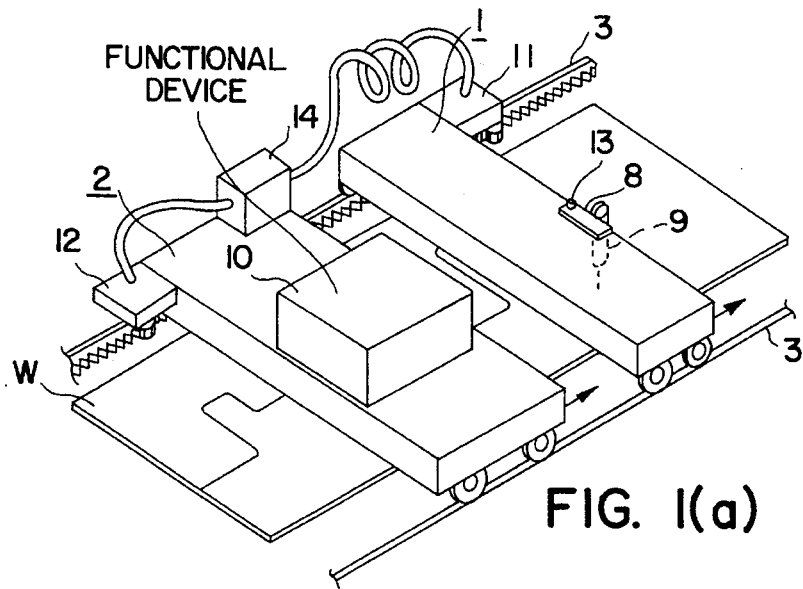
FIGS. 1 (a) to (e) are perspective views of various frame constructions of the present invention.
Figure 1B:
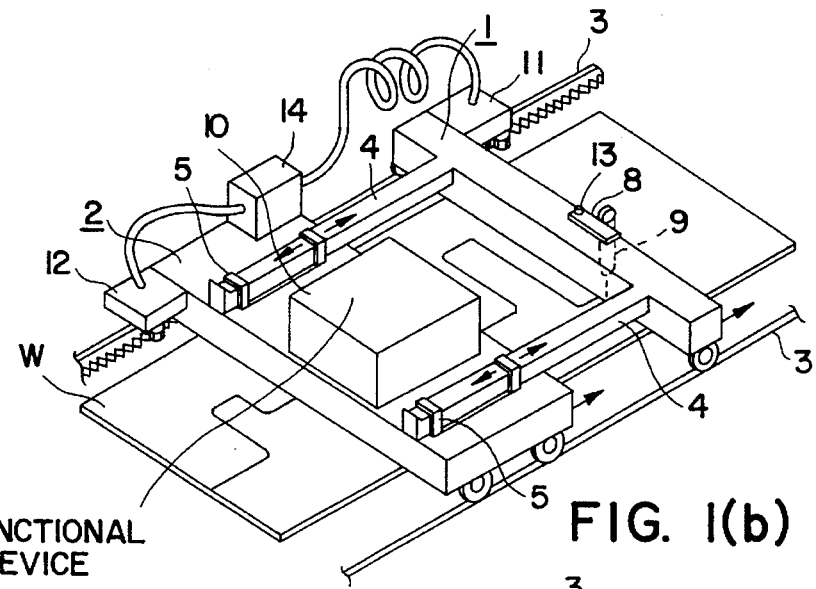
Figure 1C:
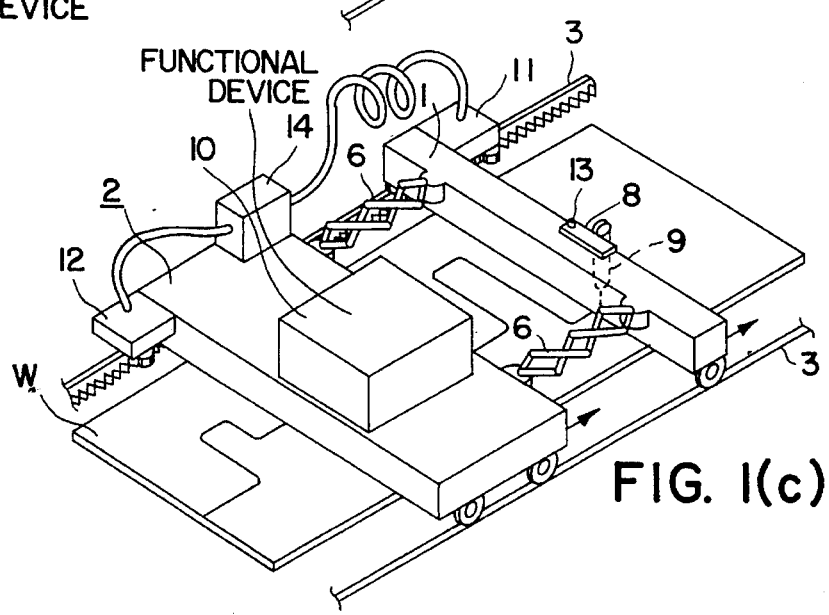
Figure 1D:
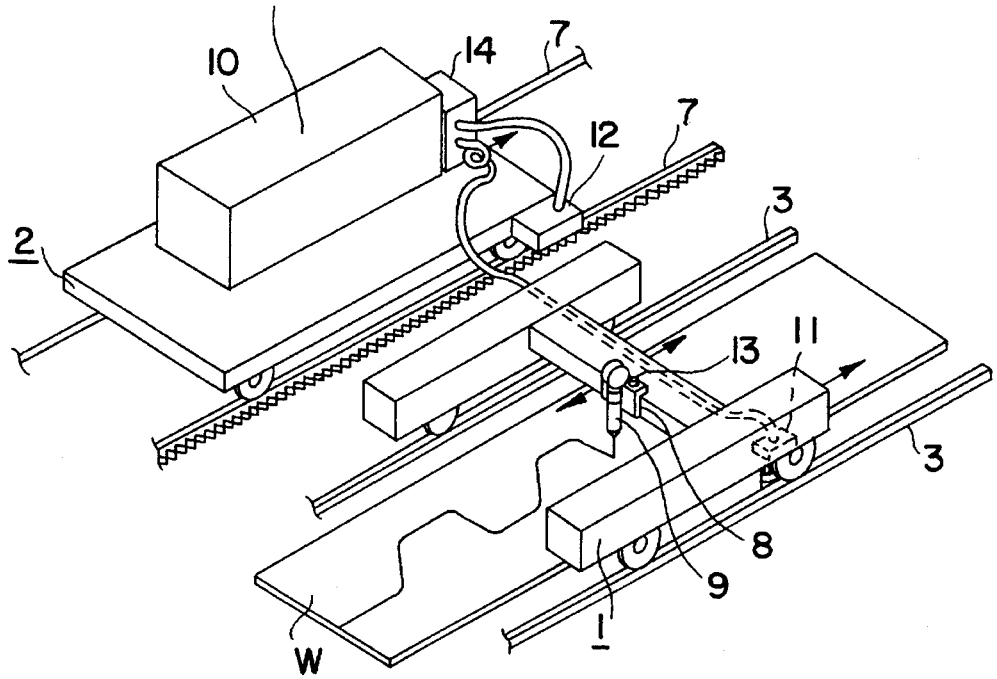
Figure 1E:
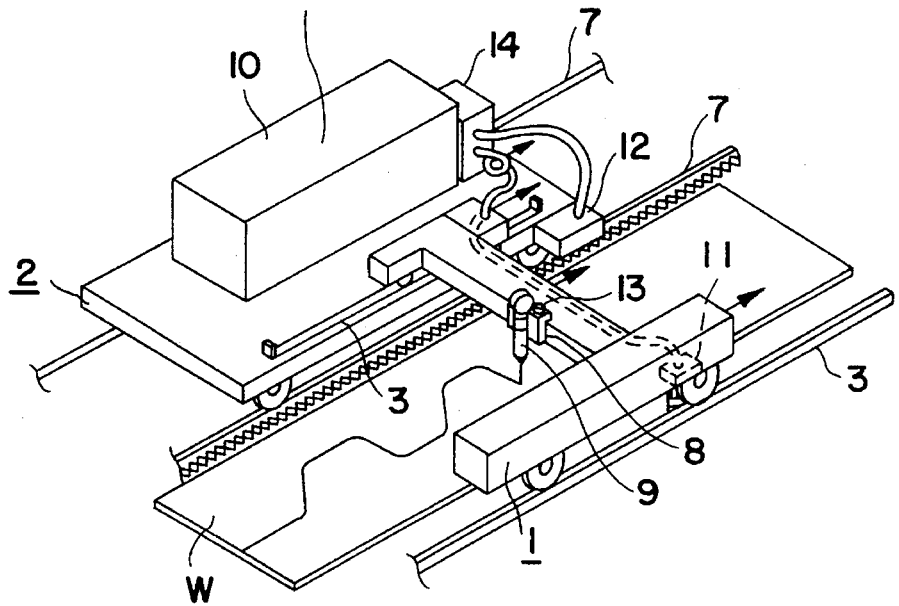

First, referring to FIGS. 1 (a) to (e), various frame constructions of the present invention are explained, and then respective embodiments of the machining device of the present invention are explained.

FIGS. 1 (a) to (c) show various frame constructions of the present invention. The frame construction of the present invention comprises first frame 1 and second frame 2. In the respective frame constructions shown in FIGS. 1 (a) to (c), first frame 1 and second frame 2 run independently on the same rails 3. In the frame construction shown in FIG. 1 (a), first frame 1 and second frame 2 run on a pair of parallel rails 3. In the respective frame constructions shown in FIGS. 1 (b) and (c), first frame 1 and second frame 2 which are engaged with each other through an engaging means run on the same rails 3.

The engaging means shown in FIG. 1 (b) comprises shaft member 4 which is provided in first frame 1 and bearing member 5 which is provided in second frame 2 and engaged with shaft member 4. The engaging means is slidable in the direction of rails 3. Further, in the frame construction shown in FIG. 1 (c), first frame 1 is engaged with second frame 2 through the engaging means comprises pantograph 6 which is expandable in the direction of rails 3.

Further, in the frame construction shown in FIG. 1 (d), two pair of rails, first and second rails 3 and 7 which are parallel with each other are laid, first frame 1 is put on first rails 3, while second frame 2 is put on second rails 7. First frame 1 and second frame 2 run independently on first rails 3 and second rails 7, respectively. First frame 1 may be engaged with second frame 2. In the frame construction shown in FIG. 1 (e), first rails 3 on which first frame 1 run and second rails 7 on which second frame 2 run are laid parallel with each other, in which one of first rails 3 for first frame 1 is mounted on second frame 2.

Carriages 8 are mounted on the respective first frame 1 so as to be movable in a direction perpendicular to the laid directions of first and second rails 3 and 7. Various tools 9 for machining workpiece W are mounted on carriage 8. Tool 9 includes various tools such as a laser torch, a plasma torch, a gas torch, cutter, and print pen and others which are used for the desired work.

Functional device 10 which makes the function of tool 9 effective is mounted on second frame 2. Further, first drive 11 for driving first frame i is mounted on first frame 1, while second drive means 12 for driving second frame 2 is mounted on second frame 2, and third drive means 13 for driving carriage 8 is mounted on carriage 8. Control unit 14 for moving first and second flames 1 and 2 and tool 9 at the fixed speed to the fixed position by controlling the above-mentioned drive means 11 is mounted on second frame 2.

A method for controlling first frame 1 and second frame 2. comprises the steps of detecting the moved distance of first frame 1 and the moved distance of second frame 2 by using rotary encoders mounted for the respective drive means 11 and 12, and controlling second frame 2 against first frame 1 in such a manner that a difference between the detected quantities can be compensated.

Further, first frame 1 and second frame 2 may be controlled by controlling the respective drive means 11 and 12 for first frame 1 and second frame 2 in accordance with a program which is preset such as numerical control. Further, first frame 1 and second frame 2 may be controlled by measuring an interval between first frame 1 and second frame 2 in the direction of progress for example by a laser measuring device, and controlling second frame 2 against first frame 1 in such a manner that variations of the interval between first frame 1 and second frame 2 from a reference thereof can be compensated. Further, first frame 1 and second frame 2 can be controlled by giving the same driving force or the same braking force to first frame 1 and second frame 2.

Then, referring to the drawings, various embodiments of machining devices provided with the above-mentioned frame constructions explained.

FIRST EMBODIMENT

Figure 2:
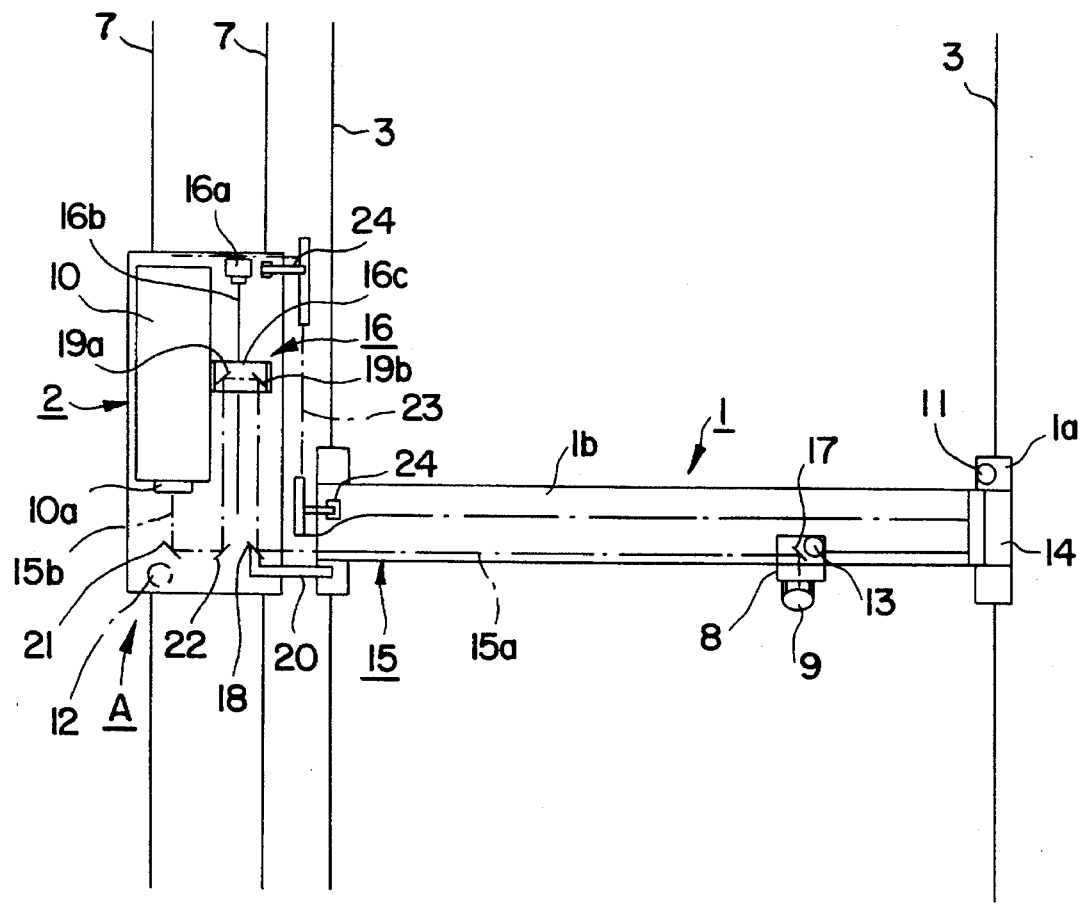
FIG. 2 is a plan view of a construction of a laser machining device provided with the frame construction of the present invention, as a first embodiment of the present invention.
Figure 3:
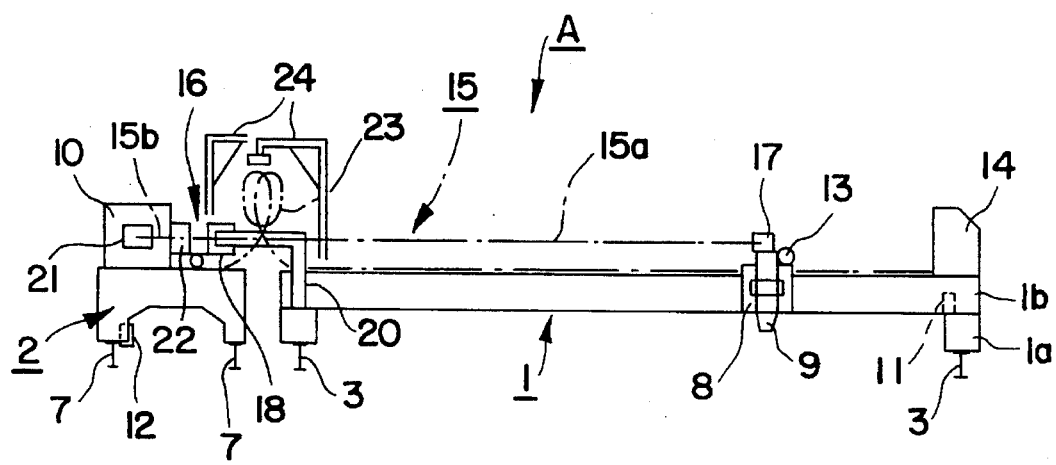
FIG. 3 is a front view of the laser machining device shown in FIG. 2.
Figure 4:
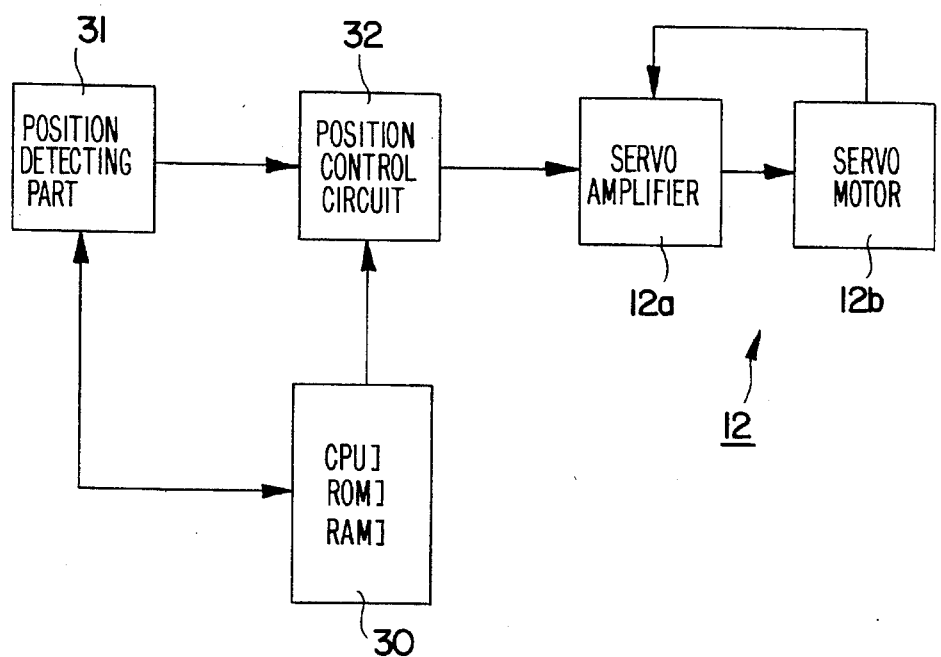
FIG. 4 is a block diagram showing a control system for making a second frame follow up a first frame in the frame construction of the present invention.

FIG. 2 is a plan view of a construction of a laser machining device provided with the frame construction of the present invention, as a first embodiment of the present invention, and FIG. 3 is a front view of the laser machining device shown in FIG. 2. FIG. 4 is a block diagram showing a control system for making a second frame follow up a first frame in the frame construction of the present invention.

Referring to FIGS. 2 and 3, first frame 1 is put on first rails 3 which are laid according to a specification thereof so that first frame 1 can run on first rails 3 by driving first motor for longitudinal feed 11 as first drive means. Further, first motor for longitudinal feed 11 is provided with a rotary encoder (not shown) so that the rotary encoder detects rotations of a first motor for longitudinal feed 11 to generate a pulse signal.

First frame 1 comprises saddle 1a and cross girder 1b which is arranged in a direction perpendicular to first rails 3. Carriage 8 is mounted on cross girder 1b, which is moved along cross girder 1b by a driving motor for traverse feed 13 as third drive means. Carriage 8 is provided with laser torch 9 as a tool.

Control unit 14 such as a numerical control (NC) is mounted on first frame 1, in which a longitudinal feed of first frame 1, a traverse feed of carriage 8, the driving of laser generator 10 as the functional device for making laser torch 9 mounted on second frame 2 operate, the driving of reversing device 16 for keeping a constant length of optical path 15 (15a, 15b) from laser generator 10 to a laser torch 9, and other driving parts can be controlled.

Second rails 7 are laid parallel with first rails 3, and second frame 2 is put on second rails 7. Second frame 2 is driven by means of second motor for longitudinal feed 12 as the second drive means so that second frame 2 can run on second rails 7. A motor for longitudinal feed 12 is provided with a rotary encoder (not shown) so that the rotary encoder detects rotations of motor for longitudinal feed 12 to generate a pulse signal.

Laser generator 10 and reversing device 16 are mounted on second frame 2. Second frame 2 is made of material with sufficient strength and stiffness so that the weight of high-power laser generator 10 can be properly surely supported. Further, an interval between second rails 7 is determined according to the size of second frame 2.

Optical path 15 of from laser generator 10 to laser torch 9 is divided into first optical path 15a formed on first frame 1 and second optical path 15b formed on second frame 2. First optical path 15a is formed by first mirror 17 and second mirror 18 arranged in opposition to first mirror 17, wherein first optical path 15a is protected from outdoor light and atmosphere by means of an expandable member, for example bellows (not shown). Further, second mirror 18 is supported by stay 20 so that the second mirror 18 is opposed to fourth mirror 19b of reversing device 16.

Second optical path 15b is formed by fifth mirror 21 arranged so as to be opposed to aperture 10a of laser generator 10, sixth mirror 22 for changing the laser beam's direction toward reversing device 16, and a pair of mirrors, third and fourth mirrors 19a and 19b forming reversing device 16. Second optical path 15b is protected by means expandable member in the same manner as first optical path 15a.

Reversing device 16 is provided for keeping the length of optical path 15 at a constant length. Reversing device 16 is provided, in a case where there is a substantial difference between the length of optical path 15 between laser torch 9 and laser generator 10 when laser torch 9 comes the closest to laser generator 10 and the length of optical path 15 between laser torch 9 and laser generator 10 when laser torch goes the farthest from laser generator 10, that is, on a machining device in which the effective work width by laser torch 9 is large.

Reversing device 16 comprises drive motor 16a, ball screw 16b, and movable holder 16c which is engaged with ball screw 16b and on which third and fourth mirrors 19a and 19b are attached. Reversing device 16 is controlled by control unit 14 so that a change in the length of optical path 15 accompanied by the transverse feed of laser torch 9 is compensated by which movable holder 16c is moved so that the length of optical path 15 is kept at a constant length.

In the drawing, numeral 23 designates a cable with which control unit 14, motor for longitudinal feed 12 of second frame 2, laser generator 10 mounted on second frame 2, and drive motor 16a of reversing device 16 and other members are connected. Further, numeral 24 designates a hanger of cable 23. Cable 23 follows up a relative displacement of first frame 1 and second frame 2.

Then, a control system of the above-mentioned machining device A is explained. The above-mentioned control unit 14 includes main control part 30 shown in FIG. 4 which is comprised of CPU, ROM, RAM and others. CPU is a central processing unit, in which a program is read out from the undermentioned ROM and an external device such as an input device (not shown), the needed operation and decision a are carried out according to the program, and thereby various controls are carried out.

CPU comprises an operation part in which pulse signals outputted from rotary encoders which are mounted for first motor for longitudinal feed 11 of first frame 1, second motor for the longitudinal feed 12 of second frame 2, motor for traverse feed 13 of carriage 8, respectively, are manipulated so that the respective position and moving speed of first frame 1, second frame 2, and carriage 8 can be obtained and in which a signal for instructing the driving of first motor for longitudinal feed 11, second motor for longitudinal feed 12, and motor for traverse feed 13 is generated. Further, CPU controls laser generator 10, reversing device and an assist gas supplying device ( not shown ).

ROM is a read-only memory, in which the operation program for generating the operation signal corresponding to moving speed of laser torch 9 for machining material W to be machined is stored. The operation is executed based on signals from the above-mentioned rotary encoders according to the operation program so that the drive signal for first motor for longitudinal feed 11, and the signal for motor for traverse feed 13 are sent to first motor for longitudinal feed 11, and motor for traverse feed 13, respectively. Further, in ROM, various data needed for executing various programs for making the CPU operate and carrying out the machining of material are stored.

RAM is a read-write memory, in which the present position and moved speed of first frame 1, second frame 2, and carriage 8 are optionally stored, respectively, and sent to a CPU, in which the drive signal for driving first motor for longitudinal feed 11, second motor for longitudinal feed 12, and motor for traverse motor 13 is operated based on position and moved speed of first motor for longitudinal feed 11, second motor for longitudinal feed 12 and carriage 8, respectively.

Further, RAM has a working area in which data for which CPU is instructing and the result a of operation the are temporarily stored, a buffer area in which various data inputted from external device (not shown) are stored, and others.

Then, referring to FIG. 4, a control system for making second frame 2 following up first frame 1 is explained. Herein, first frame 1 is moved at the fixed speed to the fixed position by driving first motor for longitudinal feed 11 based on the work program which is preset through NC and others. In FIG. 4, numeral 31 designates a position detecting part for detecting the position of second frame 2 from pulse signal generated in the rotary encoder mounted for second motor for longitudinal feed 12 of second frame 2.

Numbers of pulses in the positive and negative directions generated in the rotary encoder are measured in position detecting part 31, respectively. Herein, the fixed coordinate origin is preset in machining device A, and the measured numbers of pulses are converted into the moved distance from coordinate origin by which the position of second frame 2 can be detected.

Position detecting part 31 sends the position information to main control part 30, and the fixed pulse signal to position control circuit 32 corresponding to the position information so that second frame 2 follow first frame 1. Then, position control circuit 32 converts the pulse signal outputted from position detecting part 31 into analog signal having the fixed voltage which is sent to second motor for longitudinal feed 12.

Main control part 30 sends control command to position control circuit 32 according to the program for the preset relative position and speed of first frame 1 and second frame 2. In position control circuit 32, timing in which second driving means 12 is sent to second motor for longitudinal feed 12, and others are controlled. Second drive means 12 forms a servo mechanism composed of servo amplifier 12a and servo motor 12b so that second drive means 12 can follow an optional change in set point which is commanded by position control circuit 32.

Next the procedure for machining material by machining device A formed as mentioned hereinabove is explained. First, information on a shape to be machined is inputted into control unit 14. Then, when the start of work operation is instructed, the operation of machining device A is started according to the programmed order of operation which is preset so that first motor for longitudinal feed 11 of first frame 1, and motor for traverse feed 13 are driven, wherein because first frame i is formed of a light frame, first frame 1 and carriage 8 are smoothly moved by first motor for longitudinal feed 11 and motor for traverse feed 13.

As above-mentioned, as first motor for longitudinal feed 11 starts running, first frame starts running, and a speed of first frame i rises up to a set speed. However, at this time, second frame 2 does not yet run. Rotations of first motor for longitudinal feed 11 are detected by the rotary encoder mounted for first motor for longitudinal feed 11, and pulse signal outputted from the rotary encoder mounted for first motor for longitudinal feed 11 is sent to control unit 14, in which after rotations of first motor for longitudinal feed has been detected, second motor for longitudinal feed 12 of second frame 2.

With rotation of second motor for longitudinal feed 12, second frame 2 follows up first frame 1 so that second frame starts running in the same direction as the running direction of first frame 1. The time required for the speed of second frame 2 to be increased to a set speed is set to be longer than the time required for speed of first frame 1 to be increased to a set speed. Therefore, second frame 2 slowly starts running. Accordingly, a lag in the position between first frame 1 and second frame 2 is generated.

Rotations of second motor for longitudinal feed 12 are detected by the rotary encoder mounted for first motor for longitudinal feed 12, and pulse signal is outputted from the rotary encoder to control unit 14, in which rotations of first motor for longitudinal feed 11 and rotations of second motor for longitudinal feed 12 are operated from pulse signals sent from the respective encoders so that a delay in the shift between first frame 1 and second frame 2 can be detected. Then, when first frame 1 is stopped, speed of second frame 2 is controlled, while second frame 2 is run until a delay in the shift between first frame 1 and second frame 2 comes to zero. Thereby, when each of first and second frames i and 2 is stopped, both frames 1 and 2 maintain a constant relation of positions.

Control of running of second frame 2 is possible not only by making second frame 2 follow up first frame 1 based on the detection of rotations of first motor for longitudinal feed 11 of first frame, but also by driving second frame 2 while instructing coordinate of position of second frame to be moved to second motor for longitudinal feed 12 from control unit 14. In this case, second frame 2 starts running simultaneously with a start of the first frame, However, since time lag between the increase of speed of first frame 1 and the increase of speed of second frame 2 exists, second frame 2 follows up first frame 1.

With rotations of the motor for traverse feed 13, laser torch 9 is traversed along cross girder 1b. Control unit 14 generates a drive signal for the motor for traverse feed 13, simultaneously with the generation of drive signal for drive motor 16a of a reversing device 16 so that drive motor 16a is rotated, and moves moving base 16c.

As above-mentioned, simultaneously with traversing of laser torch 9, reversing device 16 is operated so that the length of optical length 15 formed between laser generator 10 and laser torch 9 is kept nearly at a constant length. However, because second frame 2 following up first frame 1 generates a lag in the position between first frame 1 and second frame 2, the length of optical length 15 cannot be strictly maintained at a constant length. However, a change in the length of optical path 15 accompanied by the position lag between first frame 1 and second frame 2 can be neglected in the practical machining process.

With rotations of the motor for longitudinal feed 11, and motor for traverse feed 13, laser torch 9 arrives at the fixed starting point of work, when drive signal is outputted from control unit 14 to laser generator 10, which emits laser beam. The laser beam is sent through fifth-, sixth-, fourth-, third-, second-, and first mirrors 21, 22, 19a, 19b, 18, and 17 to a lens (not shown) which is provided in a laser torch, condensed by the lens, and a condensed beam is applied to material to be machined. Further laser torch 9 is connected with an assist gas supply device (not shown). Simultaneously with application of laser the beam to material to the be machined, assist gas is injected to material to be machined.

The work operation upon a workpiece is started by applying a laser beam from laser torch 9 to material to be machined and injecting assist gas to material to be machined. Then, according to the information about t-he work operation upon a workpiece in the above-mentioned condition, first motor for longitudinal feed 11 of first frame 1 and the motor for traverse feed 13 are driven so that work operation such as cutting, welding, marking and engraving are executed.

When work operation upon a workpiece is executed, there is a case where first frame 1 runs back and forth on rails 2. For example, when first frame 1 run a in the reverse direction against the prior direction of progress, rotations of first motor for longitudinal feed 11 is detected by the rotary encoder for the motor for longitudinal feed 11, and the pulse signal is sent from the rotary encoder for longitudinal feed 11 to control unit 14.

In control unit 14, the number of pulse signals sent from the rotary encoder for motor for longitudinal feed 11 is deducted from the number of the pulse signal which is presently being operated. When the difference in the number of pulse signal between both pulse signals is less than the fixed amount, a drive signal which commands the second motor for longitudinal feed 12 to decelerate is outputted from control unit 14 to second motor for longitudinal feed so that second frame 2, after being slowed down and stopped, starts running with following up first frame 1.

In machining device A formed as above-mentioned, laser torch 9 with a light weight is mounted on first frame 1, while laser generator 10 with a heavyweight is mounted on second frame 2. Therefore, the load against the motor for longitudinal feed 11 can be reduced, since the weight to be supported by first frame 1 is lighter.

Accordingly, it becomes possible to smoothly change the running speed of a torch so that even in a case with a laser generator of high power, it is possible to remove poor influence on a frame attendant with an increase in weight so as to maintain machining tolerance. Further, since first frame 1 and second frame 2 are put on different rails 3, 7, respectively, oscillation is caused by running of second frame 2 on second rail 7 in order not to exert a bad influence on running of first frame 1 on first frame 1.

SECOND EMBODIMENT

Figure 5:
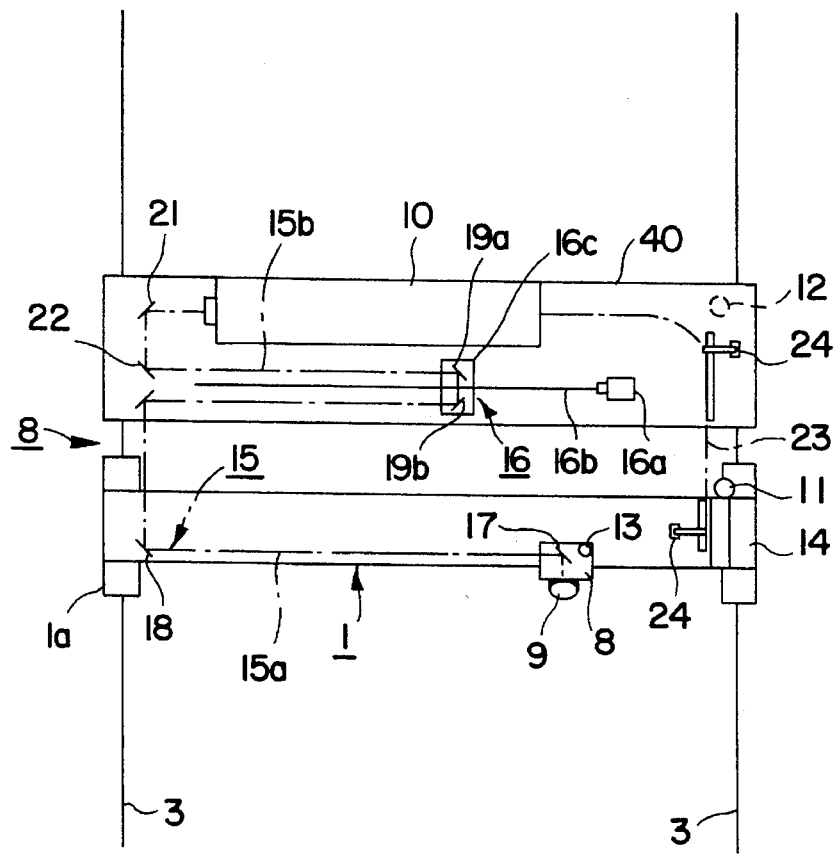
FIG. 5 is a plan view showing a construction of a laser machining device provided with the frame construction of the present invention, as a second embodiment of the present invention.

Next, the construction of a machining device B according to a second embodiment is explained. FIG. 5 shows the construction of a laser machining device provided with a frame construction as a second embodiment of the present invention, wherein like parts or parts which perform the same tasks as the first embodiment are given like reference characters, and explanation pertaining to them is omitted.

Referring to FIG. 5, second frame 2 of machining device B is put on rail 3 in the same way as first frame 1 so as to be able to run on rail 3, and laser generator 10 and reversing device 16 are arranged in the direction intersecting perpendicularly to first frame 3. A sensor ( not shown ) is located on first flame 1 and or second frame 2.

In the machining device of the present embodiment, it is also possible to maintain the accuracy of machining of workpiece by laser torch 9 in the same manner as the machining device A of the first embodiment. However, since there is the possibility of oscillation caused by running of second frame 2 being transmitted to first frame 1, it is preferable to make second frame 2 work smoothly.

Laser torch 9 is used in machining devices A, B in the first and second embodiments. However, even in a machining device with a plasma torch or a gas torch, it is basically possible to construct a machining device in the same manner as machining devices A or B.

For example, in a case where a plasma machining device is constructed for edge preparation, a plurality (two to four) of carriages 8 are mounted on first frame 1, and two plasma torches (for V edge preparation) or three plasma torches (for X edge preparation) are mounted on the respective carriages 8, while plasma electric power sources are mounted corresponding to the number of plasma torches.

According to the above-mentioned construction, drawing of cabtire-cable for connecting a plasma electric power source with a plasma torch is made easy. by which the weight of a plasma electric power source is increased by increasing the number of plasma torches. Nevertheless, the smooth movement of a plasma torch can be performed to maintain the machining accuracy.

In the case where a gas machining device is constructed, gas torches are mounted on the respective carriages 8 which are provided on first frame 1, while valves acting to open and block the passage of supply pipes for feeding preheating oxygen, fuel gas, and cutting oxygen to the gas torches, pressure regulating valves and back fire preventing device are mounted on second frame 2 corresponding to the number of the gas torches, by which the weight of functional devices are increased with an increasing number of gas torches, nevertheless it is possible to smoothly move the gas torches to maintain the machining accuracy.

THIRD EMBODIMENT

Figure 6:
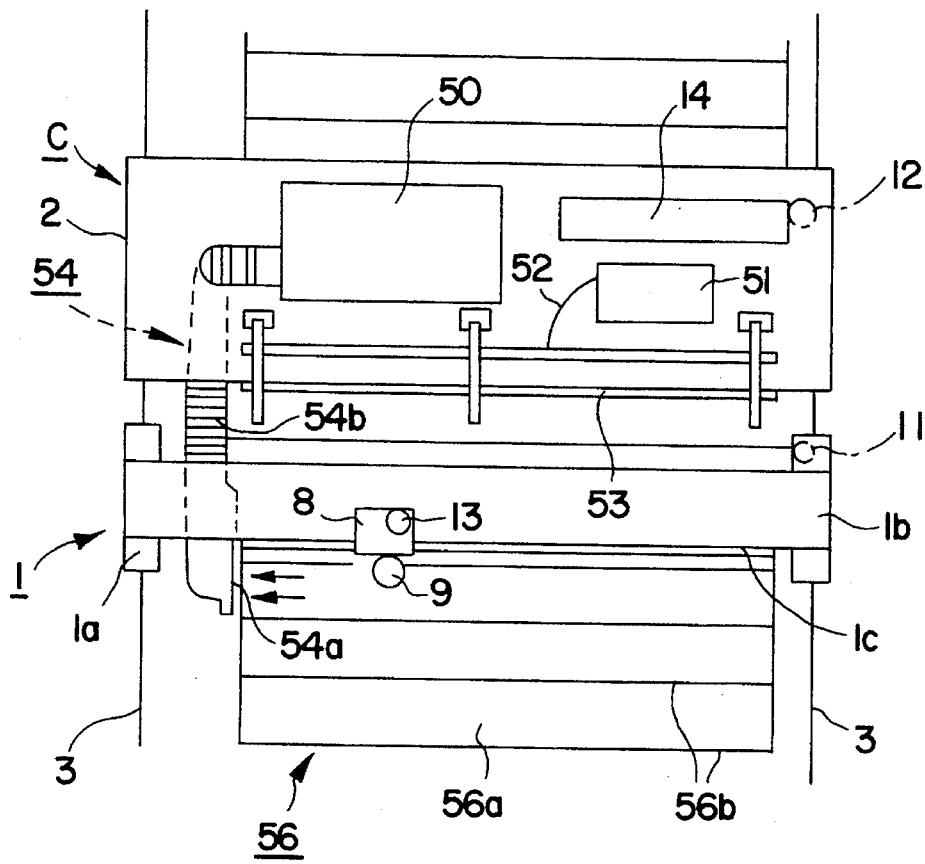
FIG. 6 is a plan view showing a construction of a machining device provided with the frame construction of the present invention, as a third embodiment of the present invention.
Figure 7:
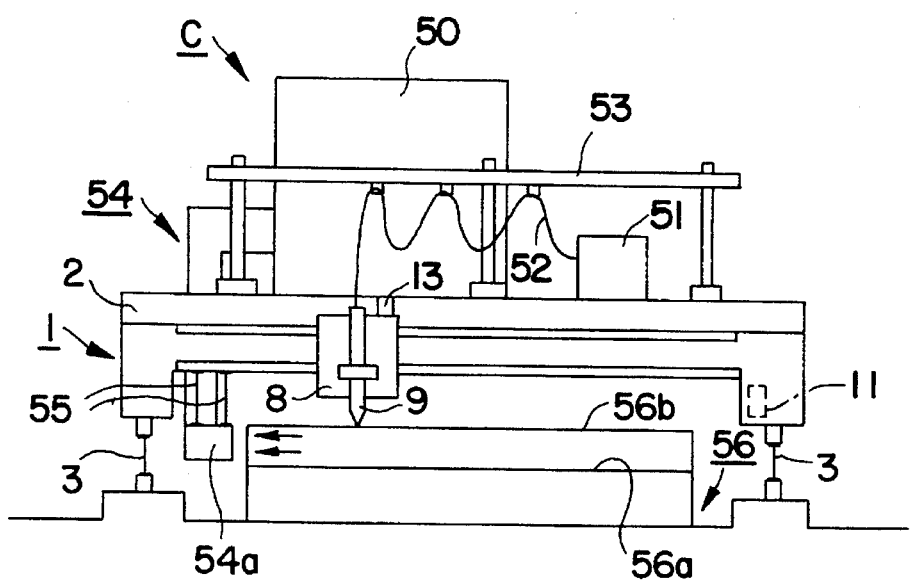
FIG. 7 is a front view of the machining device shown in FIG. 6.

Next a machining device provided with a dust collecting equipment is explained as a third embodiment. and FIG. 6 is a plan view of a machining device according to the present invention, FIG. 7 is a front view of the machining device shown in FIG. 7, wherein like parts or parts which perform the same tasks as the first embodiment are given like reference characters, and an explanation about them is omitted.

In FIGS. 6 and 7, first frame 1 and second frame 2 forming the machining device C are put on a pair of rails 3 laid parallel to each other so that both flames 1 and 2 can run on the same rails 3. In the embodiment, a plasma cutting torch is used as tool 9 from which dusts are most produced by cutting material.

Control unit 14 for controlling driving first motor for longitudinal feed 11 of first frame 1, a motor for traverse feed 13, and a second motor for longitudinal feed 12 of a second frame 2, and dust collecting equipment 50 and relay board 51 for a plasma cutting torch which is cutting torch 9 are mounted on second frame 2.

Control unit 14 acts to control a plasma electric power source for plasma arc machining, a plasma gas supply device, a dust collecting device 50 and others instead of the control of laser generator 10 for laser machining shown in the first embodiment, reversing device 16, and an assist gas supply device and others, wherein the control section for regulating the movement of first frame 1 and second frame 2 is formed in the same manner as the first embodiment.

Relay board 51 is connected with cutting torch 9 through hoses 52 including a cabtire cable, a hose for plasma gas, a supply hose and an exhaust pipe for supplying water cooling cutting torch 9 and others, and hoses 52 are suspended from hanger 53.

In the case where a gas cutting torch is used as a cutting torch 9, functional members such as valves acting to open and block the passage of supply pipes for feeding preheating oxygen, fuel gas, and cutting oxygen to gas cutting torch 9, pressure regulating valves and a back fire preventing device are mounted on second frame 2 instead of relay board 51. The functional members are connected with the gas cutting torch through hoses feeding oxygen and fuel gas to the gas cutting torch, and the hoses are suspended from hanger 53. Control unit 14 controls the supply of preheating oxygen, fuel gas, and cutting oxygen for gas machining to the gas cutting torch and others.

In FIG. 6, opening 54a of duct 54 connected with dust collecting equipment 50 is disposed near traverse rail 1c on which carriages 8 run at the end of first frame 1, and opposed to cutting torch 9.

An end of duct 54 made of a tubular member with a fixed strength and rigidity is secured to dust collecting equipment 50, while opening 54a at the other end of duct 54 is freely suspended from first frame 1 to be opposed to cutting torch 9, wherein duct 54 is formed into a shape of cantilever so that there is the possibility of opening 54a of duct 54 swinging with running of second frame 2, or of the suction efficiency of duct 54 changing when the relative difference in speed between first frame 1 and second frame 2 is produced.

Therefore, in this embodiment, the fixed length of a forward portion of duct 54 including opening 54a is formed of a rigid tubular member, while a portion thereof connected with duct collecting equipment 50 is also formed of a rigid tubular member, and a part between both the portions of duct 54 is formed of elastic bellows 54b. The forward portion of duct 54 is secured to the underside of first frame 1 through stay 55 in such a manner that opening 54a can always be held always at the fixed position, even in the case where a difference in speed is produced between first frame 1 and second frame 2.

Stationary cutting board 56 on which a workpiece is put is provided between a pair of rails 3. Stationary cutting board 56 is composed of base plate 56a and a plurality of upright plates 56b which point to the direction perpendicular to the directions of rails 3 on base plate 56a. When a workpiece is put on upright plates 56b, tubular spaces are defined by base plate 56a, upright plates 56b and the workpiece.

Opening 54a of duct 54 is positioned at a fixed height and has fixed dimensions so that stationary cutting board 56 is opposed to the tubular spaces which are defined by base plate 56a, upright plates 56b and the workpiece negative pressure of dust collecting equipment 50 is applied to the tubular spaces by which the suction of dust produced by cutting of the workpiece by cutting torch 9 is made possible.

In the above-mentioned machining device C, information needed for cutting of the workpiece, such as information on a tracing pattern of cutting torch 9, and cutting speed and plasma electric current at which the workpiece is cut, and others are inputted in advance into control unit 14, and then cutting is started, while a drive signal is sent to a motor for longitudinal feed 11, and a motor for traverse feed 13, by which first frame 1 and carriages 8 are moved longitudinally and transversely, respectively, so that cutting torch 9 traces the desired design.

Since first frame 1 is formed of a light frame on which only carriages 8 for moving transversely cutting torch 9 are mounted, during running of first frame 1, it is possible to rapidly respond to a change in the timing of starting and rotation speed of the motor for longitudinal feed 11, The tracing accuracy against the desired design, that is dimensional tolerance, the can be improved so that quality of the cut surface can be maintained.

In the same manner as the respective embodiments mentioned hereinabove, second frame 2 runs following up first frame 1. Since control unit 14, dust collecting equipment 50, plasma relay board 51 and others are mounted on second frame 2, when the condition of second frame 2 changes from stop to running, or from running to stop, the speed thereof is rapidly changed, when it is feared that a high shock is applied to second frame 2. Therefore, a rise time and a fall time of second frame 2 are set sufficiently long enough so that the shock can be prevented from being produced.

However, even if the rise time and a fall time are somewhat increased, since a first frame 1 on which cutting torch 9 is mounted is controlled according to the information on cutting of the workpiece, there is no possibility of a bad influence being exerted on the dimensional tolerance of the product and the quality of cutting surface.

FOURTH EMBODIMENT

Figure 8:
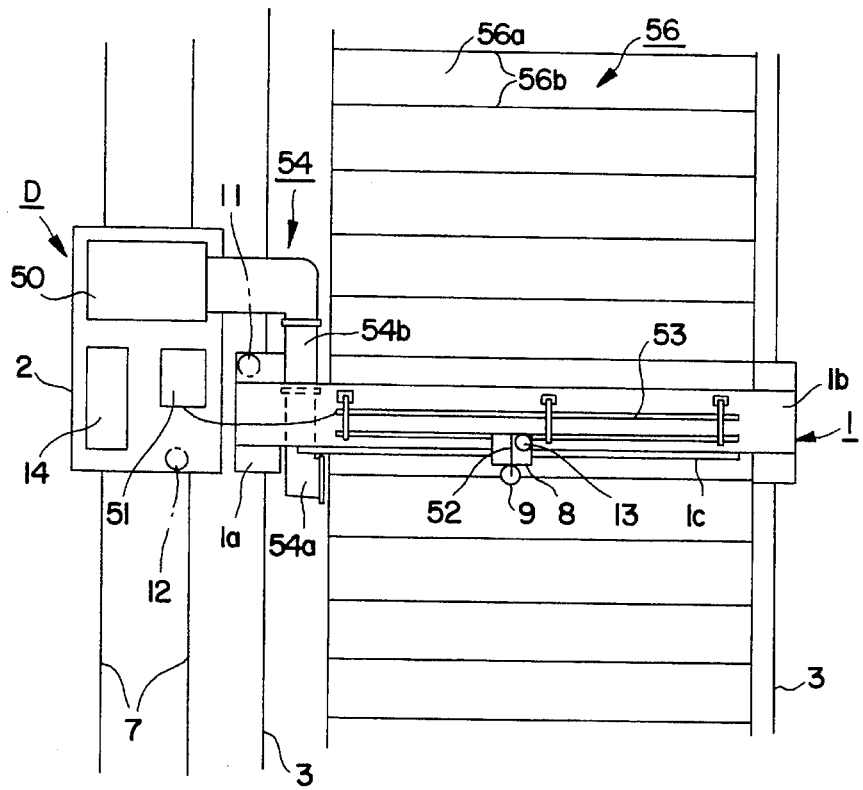
FIG. 8 is a plan view showing a construction of a machining device provided with the frame construction of the present invention, as a fourth embodiment of the present invention.

Next, machining device D as a fourth embodiment of the present invention is explained. FIG. 8 is a plan view of the machining device provided with a frame construction as the fourth embodiment of the present invention. Like parts or parts which perform the same tasks as the first through third embodiments are given like reference characters, and the explanation about them is omitted.

Referring to FIG. 8, first rails 3 and a pair of second rails 7 are laid in the same manner as the first embodiment. First frame 1 having carriage 8 on which cutting torch 9 is mounted is put on first rails 3 so as to be able to run on first rails 3, while second frame 2 on which control unit 14, dust collecting equipment 50, and plasma relay board 51 are mounted is put on second rails 7 so as to be able to run on second rails 7.

Hanger 53 is provided on first frame 1, hoses 52 including a supply hose for feeding plasma gas from plasma relay board 51 to cutting torch 9, a supply hose for cooling water, an exhaust hose for cooling water, and cabtire and others are suspended from hanger 53.

In the above-mentioned machining device D, in such a manner as the third embodiment, by controlling rotations of first a motor for longitudinal feed 11, and rotations of a motor for traverse feed 13 are controlled by a drive signal sent from control unit 14 so that second frame 2 follows up first frame, irrespective of the weight of control unit 14 and dust collecting equipment 50, cutting torch 9 can be moved smoothly along the desired tracing pattern so that workpiece can be cut. Accordingly, it is possible to improve the dimensional tolerance of product and maintain the quality of cut surface.

FIFTH EMBODIMENT

Figure 9:
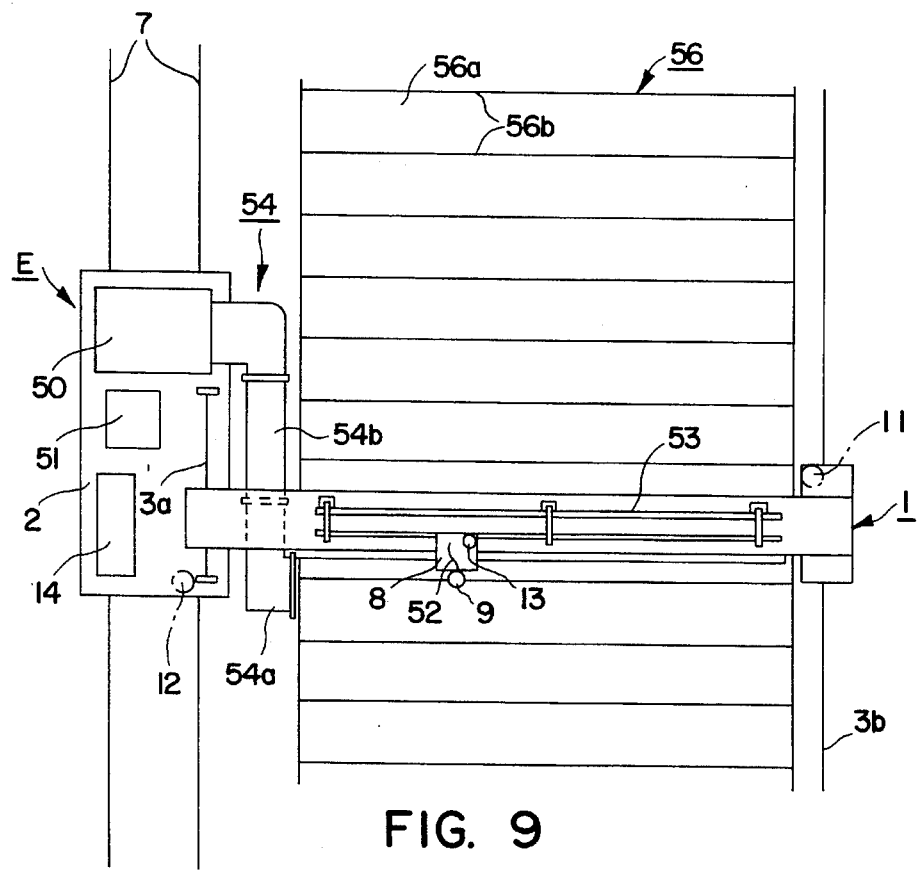
FIG. 9 is a construction of a machining device provided with the frame construction of the present invention, as a fifth embodiment of the present invention.

Machining device E of the fifth embodiment of the present invention is explained. FIG. 9 is a plan view of the machining device provided with a frame construction as the fifth embodiment of the present invention. Like parts or parts which perform the same tasks as the first through third embodiments are given like reference characters, and the explanation about them is omitted.

Referring to FIG. 9, second frame 2 on which control unit 14, dust collecting equipment 50, and plasma relay board 51 is put on a pair of rails 7 so as to be able to run on rails 7. One rail 3a is provided on rail 7 parallel to rails 7, while the other rail 3b is laid at the fixed distance from the rail 7 and parallel to rail 7.

One side of first frame 1 is put on one rail 3a, while the other side of first frame 1 is put on the other rail 3b so that first frame 1 can run on rail 3a and rail 3b.

In the above-mentioned machining device E, in such a manner as the third and embodiments, by controlling rotations of the first motor for longitudinal feed 11, and rotations of the motor for traverse feed 13 are controlled by a drive signal sent from control unit 14 so that second frame 2 follows first frame, cutting torch 9 can be smoothly moved along the desired tracing pattern so that the workpiece can be cut. Accordingly, it is possible to improve the dimensional tolerance of the product and maintain the quality of the cut surface.

What is claimed:

1. A processing apparatus for processing a workpiece with a torch comprising:
   a first frame movable on rails by a first motor, having a carriage to hold said torch in order that said torch moves in a direction perpendicular to a disposed direction of said rail
   a second frame movable on rails independently from said first frame by a second motor, and carrying a functional device for operation of said torch wherein said second frame follows said first frame, and has a lower acceleration and deceleration than said first frame to maintain a predetermined distance from said first frame.

2. A processing apparatus according to claim 1, further comprising control system to control said torch in order to move said first frame and said carriage so that said torch traces a predetermined line.

3. A processing apparatus according to claim 1, wherein the rails for the first frame and rails for the second frame are the same.

4. A processing apparatus according to claim 1, wherein the rails for the first frame and rails for the second frame are parallel to one another and the first and second frames are each on the several rails.

5. A processing apparatus according to claim 1, wherein said torch mounted on said first frame is a laser torch and said functional device mounted on said second frame is a laser oscillator.

6. A processing apparatus according to claim 1 wherein said torch mounted on said first frame is a plasma torch and said functional device mounted on said second frame is a plasma electric power source for said plasma torch.

7. A processing apparatus according to claim 1, wherein said torch mounted on said first frame is a gas torch and said functional device mounted on said second frame is a supplying device of preheating oxygen, fuel gas and cutting oxygen for said gas torch.

8. A processing apparatus according to claim 1, further comprising a duct disposed on said first frame beside said torch; a dust collecting equipment disposed on said second frame and connected with said duct.

9. A processing apparatus according to claim 8, wherein said duct and said dust collecting equipment is connected by elastic air tube.

10. A processing apparatus according to claim 2, wherein said torch mounted on said first frame is a laser torch, and said functional device mounted on said second frame is a laser oscillator.

11. A processing apparatus according to claim 3, wherein said torch mounted on said first frame is a laser torch, and said functional device mounted on said second frame is a laser oscillator.

12. A processing apparatus according to claim 4, wherein said torch mounted on said first frame is a laser torch, and said functional device mounted on said second frame is a laser oscillator.

13. A processing apparatus according to claim 2, wherein said torch mounted on said first frame is a plasma torch, and said functional device mounted on said second frame is a plasma electric power source for said plasma torch.

14. A processing apparatus according to claim 3, wherein said torch mounted on said first frame is a plasma torch, and said functional device mounted on said second frame is a plasma electric power source for said plasma torch.

15. A processing apparatus according to claim 4, wherein said torch mounted on said first frame is a plasma torch, and said functional device mounted on said second frame is a plasma electric power source for said plasma torch.

16. A processing apparatus according to claim 2, wherein said torch mounted on said first frame is a gas torch, and said functional device mounted on said second frame is a supplying device of preheating oxygen, fuel gas and cutting oxygen for said gas torch.

17. A processing apparatus according to claim 3, wherein said torch mounted on said first frame is a gas torch, and said functional device mounted on said second frame is a supplying device of preheating oxygen, fuel gas and cutting oxygen for said gas torch.

18. A processing apparatus according to claim 4, wherein said torch mounted on said first frame is a gas torch, and said functional device mounted on said second frame is a supplying device of preheating oxygen, fuel gas and cutting oxygen for such said gas torch.

19. A processing apparatus according to claim 2, further comprising duct disposed on said first frame beside said torch, a dust collecting equipment disposed on said second frame and connected with said duct.

20. A processing apparatus according to claim 3, further comprising a duct disposed on said first frame beside said torch, a dust collecting equipment disposed on said second frame and connected with said duct.

21. A processing apparatus according to claim 4, further comprising a duct disposed on said first frame beside said torch, a dust collecting equipment disposed on said second frame and connected with said duct.

22. A processing apparatus according to claim 5, further comprising a duct disposed on said first frame beside said torch, a dust collecting equipment disposed on said second frame and connected with said duct.

23. A processing apparatus according to claim 6, further comprising a duct disposed on said first frame beside said torch, a dust collecting equipment disposed on said second frame and connected with said duct.

24. A processing apparatus according to claim 6, further comprising a duct disposed on said first frame beside said torch, a dust collecting equipment disposed on said second frame and connected with said duct.

* * * * *